United States Patent [19]
Grayson et al.

[11] Patent Number: 5,963,217
[45] Date of Patent: Oct. 5, 1999

[54] NETWORK CONFERENCE SYSTEM USING LIMITED BANDWIDTH TO GENERATE LOCALLY ANIMATED DISPLAYS

[75] Inventors: George D. Grayson, Parker; James W. Bell, Plano, both of Tex.; French E. Hickman, Chicago, Ill.; Douglas W. Gillespie, Richardson; Trent M. Wyatt, Allen, both of Tex.

[73] Assignee: 7thStreet.com, Inc., Richardson, Tex.

[21] Appl. No.: 08/751,506

[22] Filed: Nov. 18, 1996

[51] Int. Cl.⁶ ................................................ G06T 17/70
[52] U.S. Cl. ............................................................ 345/473
[58] Field of Search ................................ 345/473, 115, 345/330, 333, 335, 329; 707/531

[56] References Cited

U.S. PATENT DOCUMENTS

| | | | |
|---|---|---|---|
| 3,792,243 | 2/1974 | Appel et al. | 235/151 |
| 4,884,972 | 12/1989 | Gasper | 434/185 |
| 5,111,409 | 5/1992 | Gasper et al. | 395/152 |
| 5,347,306 | 9/1994 | Nitta | 348/15 |
| 5,434,797 | 7/1995 | Barris | 364/514 |
| 5,471,318 | 11/1995 | Ahuja et al. | 358/400 |
| 5,475,738 | 12/1995 | Penzias | 379/67 |
| 5,491,743 | 2/1996 | Shiio et al. | 379/202 |
| 5,502,694 | 3/1996 | Kwoh et al. | 369/25 |
| 5,539,741 | 7/1996 | Barraclough et al. | 370/62 |
| 5,544,315 | 8/1996 | Lehfeldt et al. | 395/200.2 |
| 5,544,317 | 8/1996 | Berg | 395/200.04 |
| 5,557,724 | 9/1996 | Sampat et al. | 395/157 |
| 5,613,056 | 3/1997 | Gasper et al. | 395/173 |
| 5,657,426 | 8/1997 | Waters et al. | 395/2.85 |

*Primary Examiner*—Joseph H. Feild
*Assistant Examiner*—Alford W. Kindred
*Attorney, Agent, or Firm*—Cooper & Dunham LLP

[57] ABSTRACT

Electronic conferencing is provide over a computer network, such as the Internet, by passing streams of text with embedded explicit audio and graphics commands. Text is translated to audible speech at the end-user computers by a text-to-speech processor to reduce the amount of data transferred between computers. Implicit commands are generated from the text at the end-user computers as the audible speech is generated. Implicit command may control, for example, the animation of lips to provide a realistic image of the words of the text being spoken. Explicit commands can be used to control the voice characteristics by the text-to-speech processor or to control animation.

21 Claims, 5 Drawing Sheets

NETWORK CONFERENCE SYSTEM USING LIMITED BANDWIDTH TO GENERATE LOCALLY ANIMATED DISPLAYS

BACKGROUND OF THE INVENTION

1. Technical Field

This invention relates in general to computer software and, more particularly, to electronic conference software.

2. Description of the Related Art

The popularity of the computer networks and, in particular, the Internet, has changed the ways in which people communicate. The Internet has made electronic mail (e-mail) and electronic conferencing available to the masses. Whereas the telephone was the only means for real-time communication several years ago, many people now use the Internet to communicate for both personal and business purposes.

The Internet is a large network which connects millions of users worldwide. The number of current Internet subscribers greatly exceeds the number of subscribers envisioned by the designers of the Internet. Further, the amount of data transferred over the Internet has exploded over the last few years, due in major part to the World Wide Web (WWW). The WWW provides a graphical interface to the Internet. Accordingly, almost all Web sites are rich in graphics and sound which are automatically downloaded to users as they connect to a site. More recently, video files, such Las MPEG (Motion Picture Experts Group) and AVI (Audio Video Interleaved, also known as MICROSOFT Video for Windows) are being addled to Web sites to provide motion pictures and digital audio for downloading.

With each added feature, the amount of data communicated over the Internet increases, causing delays and frustration to users. Some experts contend that the backbone of the Internet will become overburdened in the near future due to the increase in the number of users and the amount of data being transferred during a typical session.

One type of electronic conferencing program which is becoming increasingly useful in business and personal matters is meeting software. A meeting program allows two or more users to communicate aurally and visually. The aural portion is performed by digitizing each participants voice and sending the audio packets to each of the other participants. The video portion may, for example, send graphic images of selected participants to each participant of the meeting and/or allow users to share a drawing program.

The audio and video portions take significant bandwidth. Aside from burdening the Internet infrastructure, such activity can be frustrating to the meeting participants, since the audio and video information will take a significant amount of time to transfer to each participant.

Another type of electronic conferencing program is the chat program. A chat program allows one or more participants to communicate through text typed in at the keyboard of each participant of the chat session. The video portion of a chat session can be accomplished through various techniques. Some chat rooms have no video portion and therefore only display the text of messages from the participants, while others use graphics to represent each user. Eliminating the video portion reduces the needed bandwidth relative to meeting software, but also some of the functionality.

Therefore, a need has arisen to provide effective communication through the Internet or other network without using excessive bandwidth.

SUMMARY OF THE INVENTION

The present invention communicates over a network by transferring a data stream of text and explicit commands from a host computer to one or more participant computers. The participant computers generating audible speech and implicit commands responsive to said text and generate animation responsive to said implicit and explicit commands.

The present invention provides significant advantages over prior art electronic conferencing programs, particularly with regard to the Internet and other on-line services. Most importantly, the bandwidth of transferring digital audio over a network is greatly reduced because text is transferred between computers and is translated into audible speech at the participating computers. Similarly, animation can be provided by storing graphic image files for repurposed animation at the participating computers responsive to the explicit commands and thereby reducing the bandwidth needed to produce animation at the participating computers.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENT

The present invention is best understood in relation to FIGS. 1–9 of the drawings, like numerals being used for like elements of the various drawings.

Figure 1:
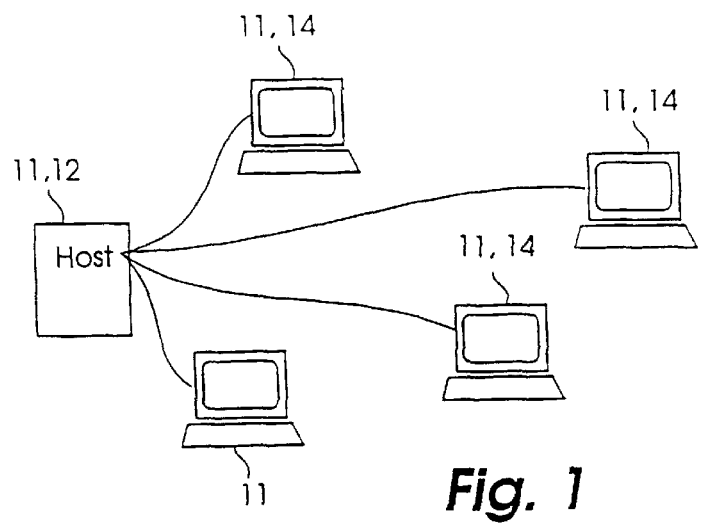
FIG. 1 illustrates block diagram of an embodiment of a network which can be used in conjunction with the present invention.

FIG. 1 illustrates an embodiment of a network of computers which can be used as described herein to allow a plurality of users to communicate with one another using low bandwidth. The network 10 could be, for example, the Internet, an Intranet (a private network using Internet protocols), a private network, such as a peer-to-peer network or a client-server network, or other publicly or privately available network. The network 10 shown in FIG. 1 includes a plurality of computers 11. The computers 11 could be wired together (such as in a private intra-site network), through the telephone lines (for example, through the Internet or through another on-line service provider), or through wireless communication. An electronic conference may be configured between a host computer 12 and one or more participant computers 14.

Figure 2:
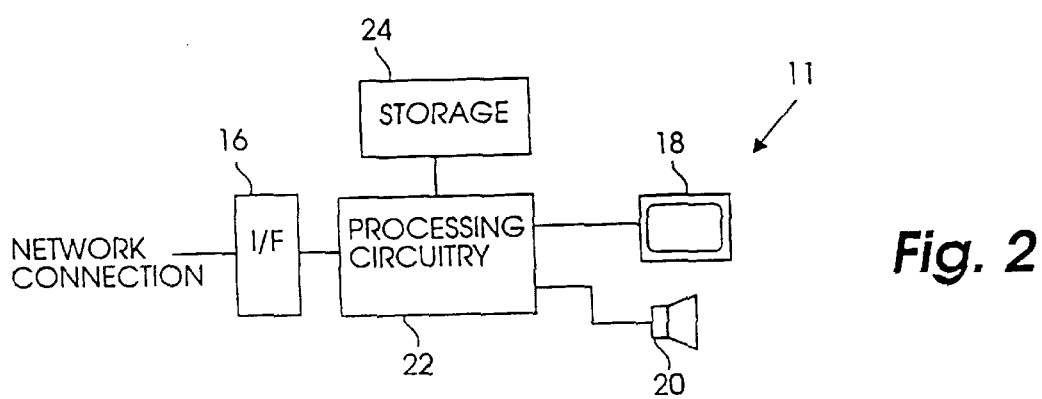
FIG. 2 illustrates a block diagram of a computer used in the network of FIG. 1.

Each of the computers 11 can be of conventional hardware design as shown in FIG. 2. The network connection is coupled to a interface 16 (for example a modem coupled to the computer's serial port or a network interface card). A display 18 and speakers 20 are coupled to processing circuitry 22, along with storage 24.

Processing circuitry 22 includes the processor, typically a microprocessor, video/graphics circuitry, such as a VGA display controller, audio processing circuitry, and input/output circuitry. Storage 24 typically includes high-speed semiconductor memory, such as DRAMs (dynamic random access memory) and SRAMs (static random access memory), along with non-volatile memory, such as CD-ROMs (compact disk read only memory), DVDs (digital versatile disk), hard drives, floppy drives, magneto-optical drives and other fixed or removable media.

In operation, the network 10 of FIG. 1 allows communication between computers at low bandwidth. Each participant computer 14 has the following resources: (1) graphic files for displaying animated characters, (2) a text-to-speech processor for converting text (typically in ASCII form) to audio speech, (3) a graphics processor to generate animation using the graphic image files responsive to graphics control information which is either implicit (from text) or explicit and (4) a communication processor controlling the flow of data between various computers 11. The text-to-speech processor could be, for example, SOFTVOICE by SoftVoice, Inc. is a software program which translates text to speech.

REPURPOSED ANIMATION

In the preferred embodiment, graphics are produced using repurposed animation. In repurposed animation, a scene is composed of a background and one or more characters. Each character may be composed of a plurality of graphic image files, each of which can be independently positioned and displayed. Animation is generated through manipulation of the graphic image files.

For example, a first character may have several graphic image files depicting different head positions. Corresponding to each head position, a set of graphic files depict different lip positions. To display the character talking, the various files depicting the lip positions are displayed in a sequence synchronized to the speech so that the lips appear to be moving in a natural pattern as the speech is output through the speakers 20. Because the files depicting the lip movements can be manipulated separately from the files displaying the head positions, only a small file need be accessed to change a lip position from one state to an other, rather than changing a large file depicting the entire character.

Repurposed animation is well known in the art, and is described in additional detail in U.S. Pat. No. 5,093,907, which is incorporated by reference herein.

An additional benefit of repurposed animation is that the various character parts can be reused to create new animation. Hence, once the participant computer has stored the various graphic image files, an unlimited number of animation sequences can be generated using the graphic image files by changing the sequence and positions of the files. Further, new files can be added to each participant computer 14 as desired.

PRESENTATIONS

In a first embodiment of the present invention, the host generates presentations on one or more participant computers. The capability is used, for example, to communicate with users as they connect to a particular site on the Internet as an alternative to high bandwidth movie files, such as MPEG and AVI files.

Figure 3:
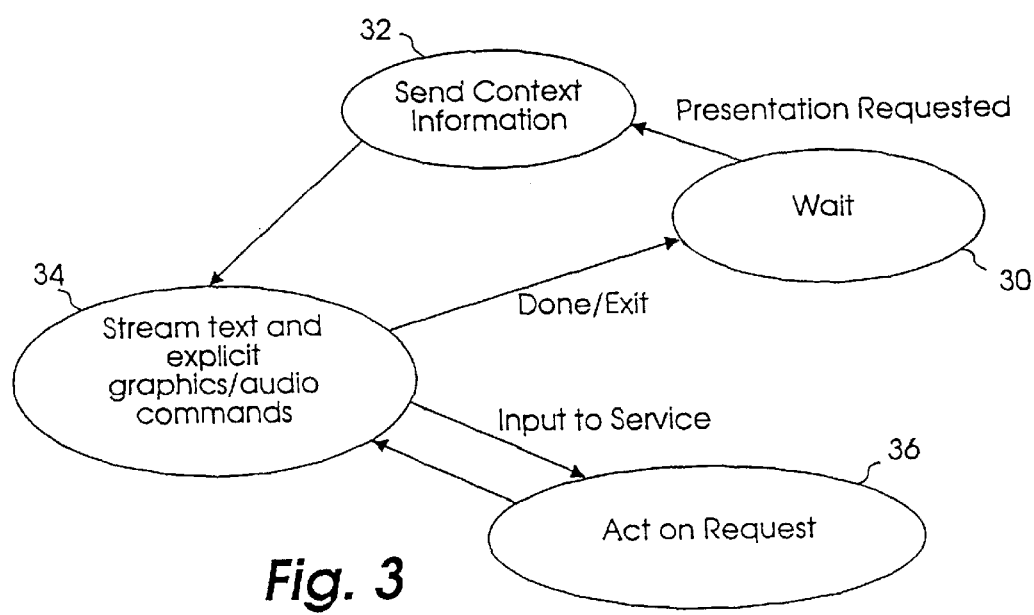
FIG. 3 illustrates a state diagram describing operation of a host computer in generating a presentation.

A state diagram showing the basic operation of a presentation from the viewpoint of the host computer 12 is shown in FIG. 3. When a new participant computer 14 connects to the site offering the presentation, the host computer 12 sends context information in state 32. The context information is used by the participant computer to set the initial scenario. The context information may define, for example, the background for the display, the locations of "hot spots" in the background which may be used by the user of the participant computer to navigate to different sites or to obtain different services, and the characters in the presentation.

In state 34, the host computer 12 begins sending a stream of text and explicit graphics and speech commands to the participant computer. The text, typically in ASCII form (although other forms could be used), defines the audio and also contains implicit graphics commands, since the text itself is used to generate the lip positions in the various characters.

For example, the following stream could be sent to a participant computer 14:

<move character_1 to position_1> <set character_1 voice, English>"Hi, how are you today."<move characters_1 to position_2>"I'd like to introduce some of my friends"<move character_1 to position_3><set character_1 voice,deep>"Where did they go?". . .

In the example above, explicit commands are set forth within <> and text is set forth between quotes. The command <move character_1 to position_1>, for example, would be interpreted by the participant computer 14 to show an animation routine which a particular character, character_1, moved from its present position to a position defined as position_1. It should be noted that while the graphics commands are shown herein as text strings, numeric code strings may sent from the host computer 12 to the participant computers for more space efficiency; however, the programming interface, shown in greater detail hereinbelow would use text streams too represent explicit commands for ease of programing.

Explicit commands may also be used for the text-to-speech processor. For example, <set character_1 voice, deep> could be used to give a character a desired inflection.

Upon receiving the stream, the participant computer 14 would begin the multimedia presentation. Thus, in response to the command <move character_1 to position_1> a participant computer 14 would begin an animation sequence defined by the command and by the present state of the animation. The command <set voice character_1> would direct the text-to-speech processor to output speech in a certain predefined profile defined for character_1. The text "Hi, how are you today" would be output, using the text-to-speech processor 46, in audio forms to the user of a participant computer 14. As the audio was output, the text-to-speech processor would output implicit control signals which indicate which phoneme is currently being output. The implicit control information is used by the graphics processor to generate lip movements. The lip movements are based not only on the particular phoneme being output, but also by other contextual information, such as the current position of the character which is speaking and other explicit graphics commands. For example, a "mad" gesture command could designate one set of lip positions mapped to the various phonemes while a "whisper" gesture command could designate a second set of lip positions mapped to the phonemes.

In state 34, the host computer stops sending the text and control information if the user of the participant computer has exited or if the presentation has completed. The user may exit to another site or simply disconnect.

In some instances, the user may generate an input which causes the presentation to be suspended or terminated pending another function. For example, a user may move to another site or initiate execution of a program, such as a JAVA (a Internet programming language by Sun Microsystems) applet or an ActiveX (an Internet programming language by Microsoft Corporation) applet by clicking on a background object. In state 36, the requested function would be performed. After the requested function was completed, control would return to state 34, where the presentation was continued or restarted.

Figure 4:
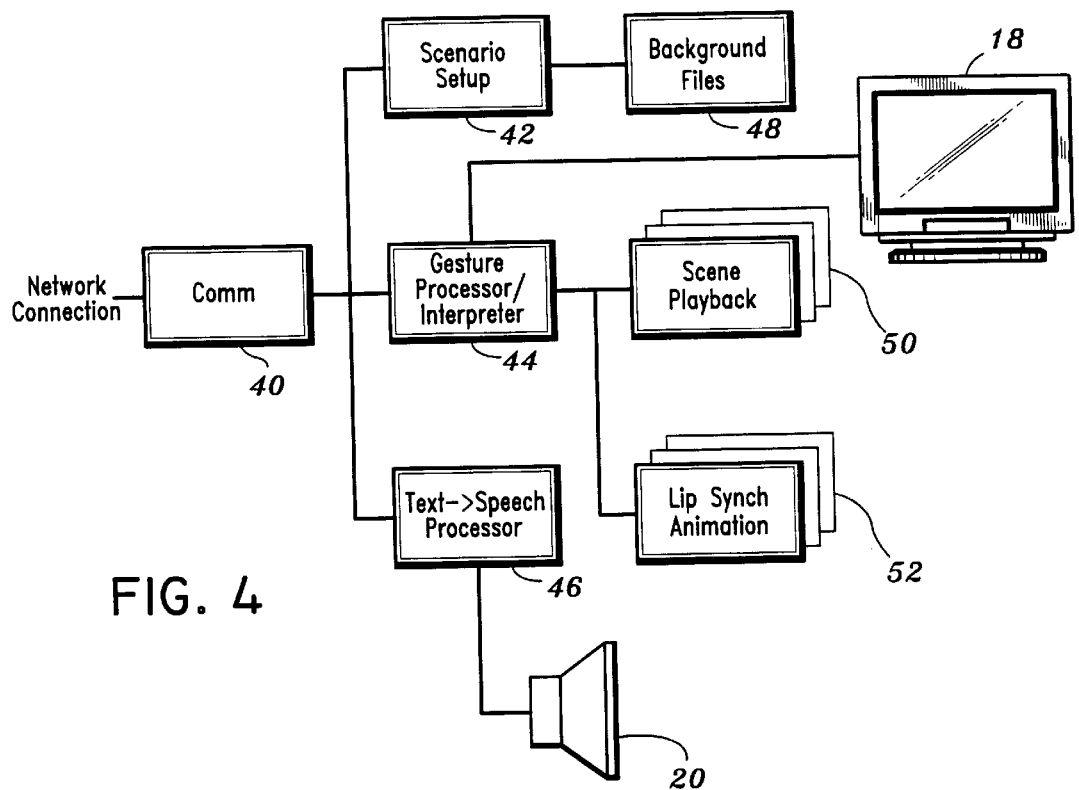
FIG. 4 illustrates a functional block diagram of a participant computer.

FIG. 4 illustrates a functional block diagram of a participant computer 14. The participant computer 14 receives commnications from the host computer 12 through communications interface 40. The information stream received from the host computer 12 may be sent to one of three subsystems for processing: the scenario setup subsystem 42, the gesture processor/interpreter 44 or the text-to-speech processor 46. The scenario setup subsystem 42 receives header information from the information stream sent by the host processor 12 to generate the background from the background database 48. The text-to-speech processor 46 receives text and explicit audio commands (such as the voice characteristic commands) from the information stream and generates an audio information stream for the computer's sound processor to generate an audible voice. The text-to-speech processor also sends phoneme identifiers to the gesture processor/interpreter 44 in real-time as the audio is generated.

The gesture processor/interpreter 44 receives explicit graphics commands from the information stream. The gesture processor/interpreter 44, based on the explicit graphics commands and the implicit graphics commands, such as phoneme information, generates the animation using character parts in the scene playback and lip synch animation databases 50 and 52.

In operation, the background, scene playback and lip synch animation databases 48–52 store graphic image files to produce animation sequences. The graphic image files can be obtained by the participant computer 14 through any number of means, such as downloading from the host computer 12 or another computer or loading from a removable media source, such as a floppy disk, CD-ROM or DVD. The databases 48–52 can be updated by the same means.

Using the graphic image files, an unlimited number of animations can be produced using repurposed animation techniques. In the preferred embodiment, at least some of the animation sequences are predefined and stored in participant computers 14. For example, "<move character_1 to position_1>" defines a particular animation sequence based on the current state of the animation. Rather than download a large number of commands setting forth the sequence from the host computer, a single command would be downloaded and interpreted by the gesture processor/interpreter 42 at the participant computers 14. As with the graphic files, new animation sequences can be added to a participant computer through downloading or loading through a removable medium.

The lip animation is dependent not only on the phoneme being output from the text-to-speech processor 46, but also by the position of the character. For example, a character facing forward would have different lip movements than a character facing sideways. Thus, if $character_1 1$ is in position_1, the lip files for position_1 are used, while position_2 may correspond to a different set of lip files. Consequently, there is a mapping between the scene playback database and the lip synch animation database.

Figure 5A:
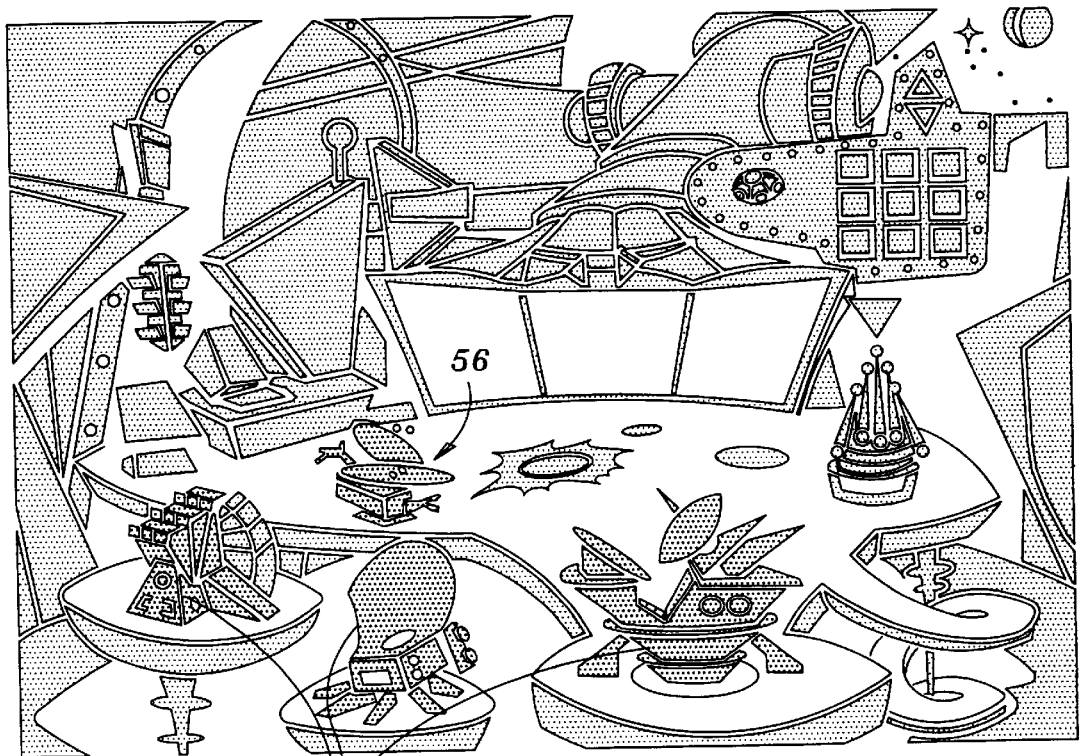
FIGS. 5a, 5b and 5c illustrate an example of a presentation.
Figure 5B:
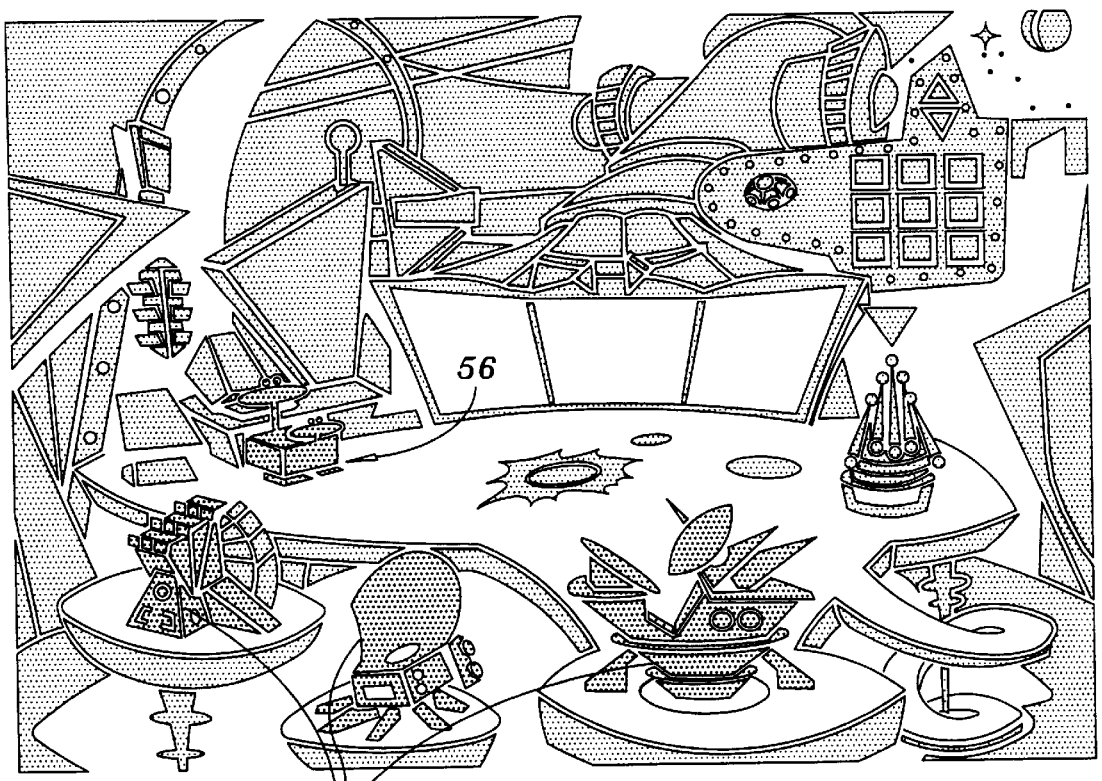
Figure 5C:
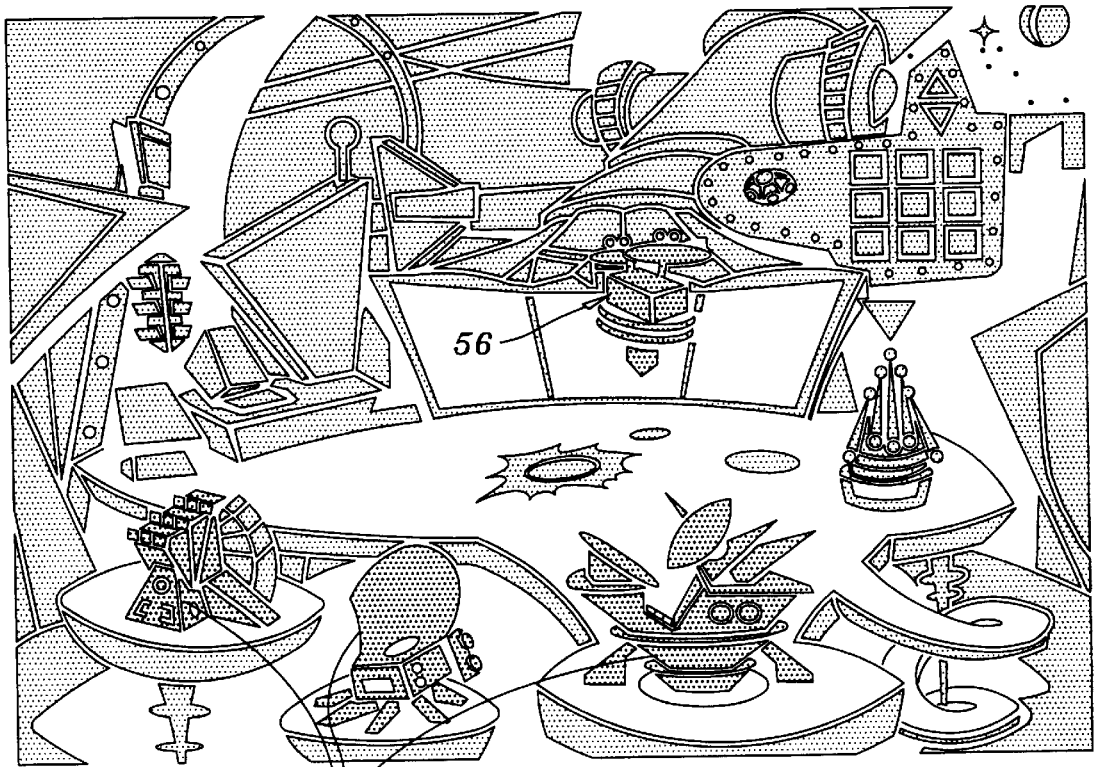

FIGS. 5a–c illustrate a sample animation which could be generated using the network described above. The depiction shown in FIG. 5a includes a background of non-animated objects 54 (i.e. objects which will not be animated dynamically responsive to the data stream from the host computer 12, but which may be moving on screen as part of the background) and a pair of characters "U2" and "ME2" which are animated as a single character 56 (hereinafter "U2ME2"). The background could be selected by header information in the data stream from the host computer 12. Some of the non-animated objects 54 may be hot spots for jumping to another site or performing a function, such as a file download or a JAVA script.

In FIG. 5a, U2ME2 is in a first position, position_1. It should be noted that a position is not necessarily a physical location on the screen, but could also refer to a particular orientation of a character. Thus position_1 and position_8 could be physically located at the same area of the screen, with U2ME2 facing towards the user in position_1 and facing towards one another in position_8.

In position_1, the characters may speak using the text and audio commands in the data stream from the host computer. As the audio is output, the phonemes are identified by the text-to-speech processor 46. The phoneme identifiers are received by the gesture processor/interpreter 44 and used to generate natural lip movements by mapping each phoneme identifier to a lip synch file (which, as described above, is also determined by the current state of the animation).

FIG. 5b illustrates U2ME2 at a second position, position_2. The movement from position_1 to position_2 would normally be a predetermined animation sequence which would be used each time the U2ME2 character moved from position_1 to position_2. At position_2, more speech could be processed from text and audio control commands from host computer 12.

In FIG. 5c, U2ME2 is in a third position, position_3. Once again, the movement from position_2 to position_3 would be a smooth animation between the two positions. Additional speech may be processed at this position.

Figure 6:
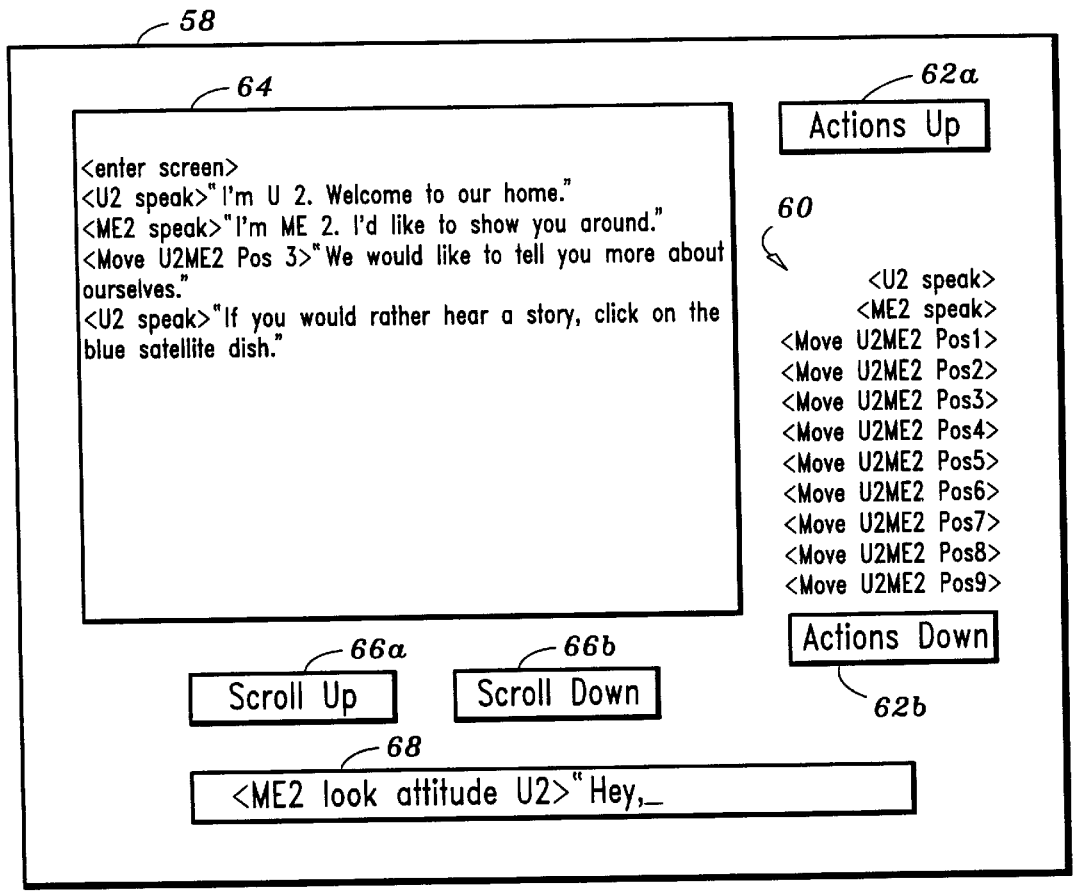
FIG. 6 illustrates a programming interface for programming presentations.

The power of the presentation system described above lies in its small size, since the animation and graphics are pre-stored in the participant computer, and in its ease in programming new presentations. FIG. 6 illustrates an example of a screen which could be used to program presentations using the characters described above.

The presentation programming screen 58 of FIG. 6 has a command area 60 which list the possible explicit graphic and audio commands which could be used in a presentation. The list of commands can be scrolled up or down using the "actions up" or "actions down" buttons 62a or 62b, respectively. To the left of the command area is the playlist area 64 which lists the entered commands for a particular presentation. The playlist can be scrolled up or down using the scroll up or scroll down buttons 66a or 66b. A work area 68 allows text to be entered, alone or in conjunction with chosen explicit commands.

A list of commands which could be used in the example presentation set for above are given below.

| COMMAND | COMMENT |
| --- | --- |
| U2 speak | set voice for U2 |
| ME2 speak | set voice for ME2 |
| Move U2ME2 Pos1 | Move U2ME2 to Position_1 |
| Move U2ME2 Pos2 | Move U2ME2 to Position_2 |
| Move U2ME2 Pos3 | Move U2ME2 to Position_3 |
| Move U2ME2 Pos4 | Move U2ME2 to Position_4 |
| Move U2ME2 Pos5 | Move U2ME2 to Position_5 |
| Move U2ME2 Pos6 | Move U2ME2 to Position_6 |
| Move U2ME2 Pos7 | Move U2ME2 to Position_7 |
| Move U2ME2 Pos8 | Move U2ME2 to Position_8 |
| Enter screen | U2ME2 enter screen |
| Exit screen | U2ME2 exit screen |
| U2 mouth ON | show U2's mouth |
| ME2 mouth ON | show ME2's mouth |
| U2 mouth OFF | don't, show U2's mouth |
| ME2 mouth OFF | don't show ME2's mouth |
| U2 talk to ME2 | U2 turns to ME2 |
| ME2 talk to U2 | ME2 turns to U2 |
| U2 talk to screen | U2 faces screen |
| ME2 talk to screen | ME2 faces screen |
| ME2 attitude U2 | ME2 talks to U2 with attitude |
| U2 attitude ME2 | U2 talks to ME2 with attitude |
| ME2 look attitude U2 | ME2 looks at with attitude |
| U2 look attitude ME2 | U2 looks at ME2 with attitude |

A presentation could quickly be generated through very few keystrokes. For example, an example presentation could be generated as follows:

| Command | Action in Presentation |
| --- | --- |
| press <enter screen> | U2ME2 enter |
| press <U2 speak> | sets text-to-speech processor to output audio in pattern defined for U2 |
| type "I'm U 2. Welcome to our home" | provides text for text-to-speech processor |
| press <ME2 speak> | sets text-to-speech processor to output audio in pattern defined for ME2 |
| type "I'm ME 2. I'd like to show you around" | provides text for text-to-speech processor |
| press <move U2ME2 Pos 3> | moves U2ME2 character to a position defined as position_3 |
| type "We would like to tell you more about ourselves." | provides text for text-to-speech processor |
| press <move U2ME2 Pos 1> | animates movement from position_3 to position_1 |
| press <U2 speak> | sets text-to-speech processor to output audio in pattern defined for U2 |
| type "If you would rather hear a story, press on the satellite dish> | provides text for text-to-speech processor |
| press <ME2 look attitude U2> | animates movement of ME2 looking at U2 in position_1 |
| press <ME talk attitude U2> | sets text-to-speech processor to output audio in pattern defined for ME2 |
| Type "Hey, that was my line." | provides text for text-to-speech processor |

In practice, a presentation could be much longer, with many more characters. However, the time spent in animating the characters for a new presentation would be minimal. Further, the size of the data stream for a 90 minute long presentation with full audio and animation would be less than 100 kilobytes and would take about a minute to load at a modem speed of 14.4 kbps (kilobits per second). Using current day methods of sending animation, such as a MPEG or AVI file, a 100 kilobyte presentation with animation and audio would last only about one second (depending upon resolution and frame rate). Moreover, the image of the MPEG or AVI file would be only about one-eighth of the screen, rather than the full screen which can be produced by the invention.

While an entire presentation can be downloaded and performed on the participant computers, in the preferred embodiment, the presentation is downloaded using progressive downloading techniques, whereby a section of the data stream is downloaded, and a subsequent section of the data stream is downloaded while the presentation corresponding to the previous download is executed on the participant computer. By downloading sections of the data stream while previous sections are executing on the participant computer, the effective download time for the presentation is reduced.

Further, a presentation may be designed to execute in an interactive or random manner by downloading sections of a data stream in response to a user action or by random selection. An example of an interactive presentation would be a story in which the user picks which door to open. Subsequent sections would be downloaded to the user depending upon which door was opened. Several such selections could be provided to make the story more interesting.

A way to make a presentation non-repetitive would be to randomly select predefined sections or select sections based on user profiles. For example, a presentation of a companies goods may randomly select which product to present to a user on a random basis, so that the user does not receive the same promotion on each visit to the site. The presentation could further choose which products to promote (and thus which sections to download) based on user profile information, such as the age and gender of the user.

CHAT/MEETING SESSIONS

Chat and meeting sessions cans be greatly enhanced by communicating with streams of text and explicit audio and graphics commands. An example of a chat interface is shown in FIG. 7.

Each participant computer 14 is assigned an "avatar" 70, which is an graphic identifier for the user. As shown in FIG. 7, the avatars 70 are generally fanciful, although it would be possible for realistic depictions to be used. Further, the avatars 70 can appear two dimensional, as shown, or appear three dimensional. In the embodiment of FIG. 7, each avatar 70 is viewed in a defined space 72, in an alternative embodiment, the avatars could move about using a VRML (Virtual Reality Modeling Language) technology.

Figure 7:
FIG. 7 illustrates a user interface for a chat session.

It should be noted that the particular embodiment of the chat session interface shown in FIG. 7 is directed towards leisure use, more serious graphics could be used for business use. Further, while the embodiment shown has a total of four users, any number of users could be supported.

Adjacent each avatar, an alias space 74 is provided for the user's name or nickname. Thus, users may use their real name or provide a nickname. The center of the interface 68 is divided into two sections, a graphic display section 76 and a text section 78. Text input by the participant computers 14 is displayed in the text section 78, while user-input graphics are displayed in the graphics section 76. A drawing toolbar 83 is displayed over the graphics section 76. The drawing toolbar 80 provides the tools for drawing in the graphics section 76. A flag icon 82 is used to define the voice inflection desired by each user. For example, the user at the participant computer 14 shown in FIG. 8 would be using an American accent; other accents could be used by clicking on the flag icon 82. The flag icon 82 represents explicit audio commands which will be sent as part of the text stream.

In operation, each user participating in the chat/meeting session chooses an avatar (or has the host computer 12 automatically choose an avatar) which is the user's graphical depiction to all other participants in the chat session. In the preferred embodiment, the user can also choose voice characteristics (such as the accent, male/female, adult/child, and so on). As described in connection with Presentations, supra, the communication is performed by transferring text with embedded explicit commands between the host computer 12 and the participant computers 14. In the case of a chat or meeting session, text and explicit commands are initiated at the participant computers 14 and uploaded to the host computer 12. When the host computer 12 receives a data stream from a participating computer 14, it forwards that stream to all computers in the particular chat/meeting session. The text is printed in the text window and transformed into audible speech by the text-to-speech processor 46 in each participant computer 14. As the speech is output, the phonemes are identified and the associated avatar is animated responsive to the phoneme identifiers.

In the preferred embodiment, the avatars are animated not only by the implicit gesture commands from the text-to-speech processor 46 in the form of phoneme identifiers, but also by explicit commands such as <angry>, <happy>, <look left> or <look down>. Other implicit commands can also be derived from the text in the form of punctuation by the "!" or "?" signs. For meeting software, additional gestures, such as raising arms to request an opportunity to speak, can be supported.

As in the Presentation section, explicit commands can be chosen from a menu or, alternatively, typed in manually.

The participant computers are structured similar to those shown in FIGS. 2 and 4. In the case of a chat/meeting session, the communications subsystem 40 not only receives and distributes data streams from the host computer 12, but also generates data streams to upload to the host computer 12. As described in connection with the Presentation section, each participant computer 14 separately stores the scene playback files (which would contain the graphics needed to animate each avatar) and the lip synch animation files.

Figure 8:
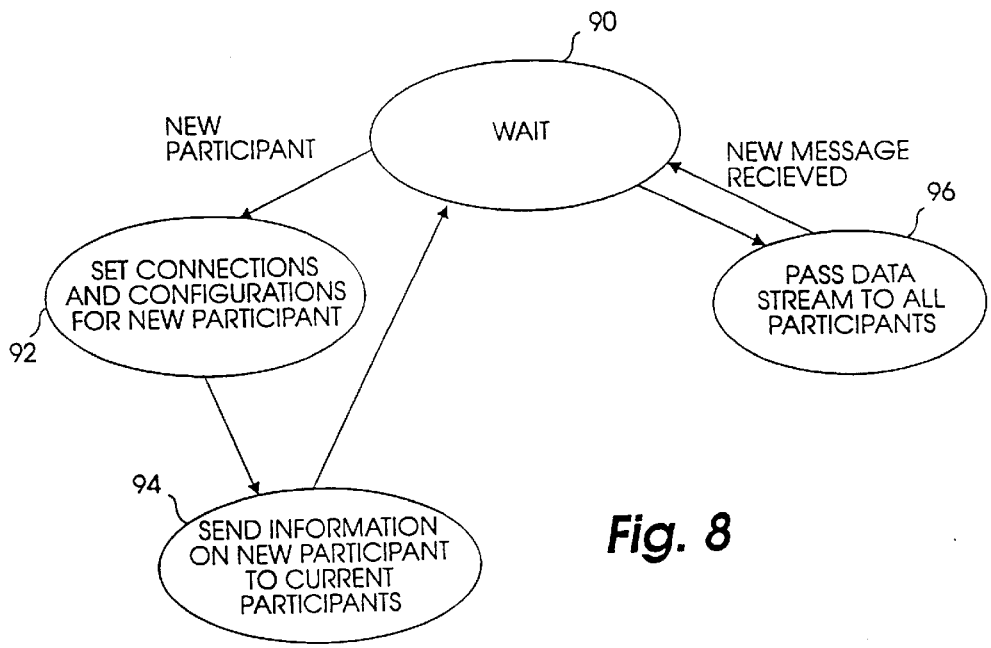
FIG. 8 illustrates a state diagram for operation of a host computer in a chat session.

A state diagram for operation of the host computer 12 during a chat session is shown in FIG. 8. In state 90, the host computer 12 is in an wait state, where it is waiting for a communication from a participant computer 14. When a new computer requests to become a participant in the chat session, the host computer and the new participant exchange information necessary for communication and audio/visual properties of the new participant in state 92. This involves, for example, identifying the user by Internet address (or other network address) and assigning avatar graphics and default voice properties. In the preferred embodiment, the user can define its avatar 74 by choosing specific characteristics, such as head, hat, nose, lips and voice type. In state 94, the host computer 12 passes information regarding the new participant computer 12 to all of the current participant computers 12, each of which should have the graphic files to output the chosen avatar. If any of the assets needed to reproduce a participant are not available, they can be downloaded from the host computer 12 or default characteristics can be used. Upon completion of the setup routine, the host computer 12 returns to the wait state 90.

When a message is received from a participant computer 14, the state shifts to state 96, where the host computer receives and stores the message and then forwards the message to all computers participating in the chat session. The host computer 12 then returns to the wait state 90.

Figure 9:
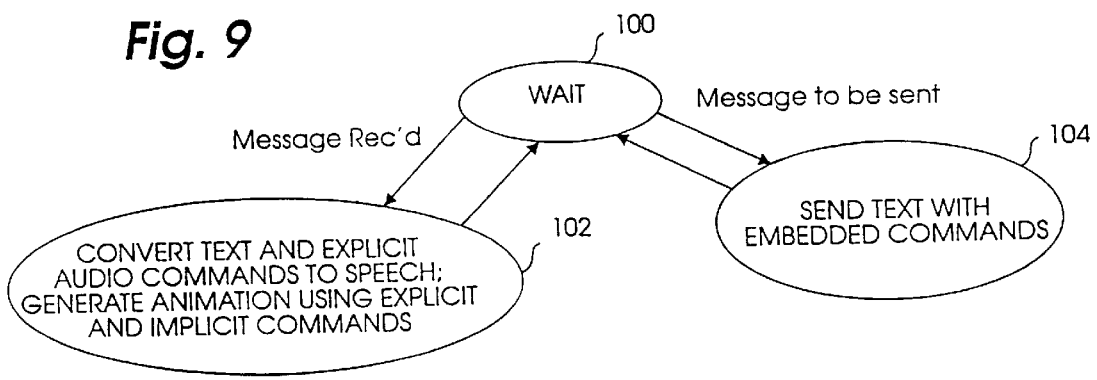
FIG. 9 illustrates a state diagram for operation of a participant computer in a chat session.

FIG. 9 shows a state diagram of the operation of the participant computers with regard to communication during a chat session. State 100 is the wait state, where no messages are currently being sent or received. As a new message is received in state 102, the text is sent to the text-to-speech processor 46 along with any explicit audio commands to generate an audible voice. Explicit graphics commands from a received message are sent to the gesture processor/interpreter 44 along with implicit graphics commands from the text-to-speech processor 46. These commands are used to animate the avatar corresponding to the received message. After the message is processed, the participant computer 114 returns to the wait state 100.

When the user of a participant computer has prepared a message to send, the state shifts to state 104, where the participant computer 14 uploads the message to the host computer 12 for broadcast to the group of participant computers 14 participating in the chat session. In uploading the message, the host computer may modify the user input; for example "<grin>" could be modified to "%G", which is smaller and easily identified as a command. Alternatively, because the bandwidth saving are minimal, the entire text of a command could be sent to the host computer.

The present invention provides significant advantages over the prior art. The invention allows audio conversations or presentations, without using significant amounts of bandwidth over the network. Applications such as chat programs are enhanced with animation, and audible speech at low bandwidth. These capabilities make the conversations much more interesting and allow participants to listen to the conversation without constant viewing of the screen, which is necessary where only text is provided. Meeting programs, which normally transfer digital audio over the network, can greatly reduce their bandwidth requirements. Accordingly, audio conversations and presentations can be almost instantaneously received and output on the participating computers with audio and graphics. Presentations can be generated with very little production time or storage requirements.

Additionally, the use of graphics can enhance communications by allowing gestures which are fanciful or otherwise incapable of communication through live transmissions.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the claims.

What is claimed is:

1. A method of communicating over a network using a limited bandwidth, comprising the steps of:

transferring a data stream of text and explicit commands from a transmitting computer to one or more receiving computers having, pre-stored graphic image files comprising representations of a limited number of movements of entities for display at the one or more receiving computers;

generating audible speech at the one or more receiving computers responsive to said text;

generating implicit commands responsive to said text; and generating animation of said entities at said one or more receiving computers responsive to said implicit and explicit commands using information from said graphic image files that has a bandwidth exceeding that of respective explicit commands.

2. The method of claim 1 wherein said step of generating implicit commands includes the step of generating lip synch commands for generating lip movements of said entities corresponding to the audible speech.

3. The method of claim 2 wherein said lip synch commands for generating lip movements of said entities comprise phoneme identifiers corresponding to the audible speech.

4. The method of claim 2 wherein said step of generating implicit commands further comprises the step of generating gesture commands for animating gestures of said entities responsive to punctuation.

5. The method of claim 1 wherein step of transferring a data stream includes the step of transferring explicit animation commands and explicit speech commands for said entities.

6. The method of claim 5 wherein said explicit speech commands define voice characteristics of said entities and said step of generating audible speech comprises the step of generating audible speech responsive to said text and said explicit speech commands.

7. The method of claim 1 wherein said one or more receiving computers comprise at least two receiving computers and further comprising the step of transferring said data stream from one of said receiving computers to said transmitting computer and transferring said data stream from said transmitting computer to one or more receiving computers to allow communication between said receiving computers.

8. The method of claim 1 and further comprising the steps of storing said graphic image files in said one or more receiving computers prior to transferring said data stream.

9. The method of claim 8 wherein said step of generating animation of said entities comprises the step of manipulating said graphic image files responsive to said explicit commands.

10. The method of claim 8 and further comprising the step of storing background files in said one or more receiving computers.

11. The method of generating a presentation on a plurality of participant computers from a host computer over a network using a limited bandwidth, comprising the steps of:

downloading a data stream including text and animation control signals from said host to said participant computers over a network connection using a limited bandwidth, said animation control signals defining an animation sequence of display entities using a plurality of image files stored at the participant computers;

generating animation on said participant computers by displaying information regarding said entities from said image files responsive to said animation control signals, wherein the bandwidth of the information from said image files exceeds that of the animation control signals in said data stream;

generating audible speech on said participant computers responsive to said text; and generating additional animation of said entities on said participant computers responsive to said text.

12. The method of claim 11 wherein said step of generating additional animation on said participating computers comprises the step of generating lip movement animation of said entities.

13. The method of claim 12 and further comprising the step of generating phoneme information as the audible speech is generated on said participating computers.

14. The method of claim 12 wherein said step of generating additional animation on said participating computers comprises the step of generating facial expressions of said entities responsive to punctuation in said text.

15. The method of claim 11 wherein said step of downloading includes downloading speech control signals for defining a voice characteristic of said entities associated with said text.

16. A method of enabling two or more participant computers to communicate over a network using a limited bandwidth, comprising the steps of:

transferring a data stream including text and commands regarding movements of animated entities from one of said participant computers to others of said participant computers, said others of said participating computers having locally stored graphic image files comprising representations of a limited number of movements of entities for display;

generating audible speech on said other participant computers responsive to said text; and generating animation on said other participant computers responsive to said data steam using said graphic image files to generate information representing respective movements of said entities at a bandwidth exceeding that of said commands regarding movements of the animated entities.

17. The method of claim 16 wherein said step of generating animation of said entities comprises the steps of:

generating phoneme identifiers corresponding the audible speech; and mapping said phoneme identifiers to the graphic image files stored on said other participant computers.

18. The method of claim 16 wherein said transferring step comprises the step of uploading a data stream including text and explicit commands from said one participant computers to said other participant computers.

19. The method of claim 18 and further comprising the step of generating animation of said entities responsive to one or more of said explicit commands.

20. The method of claim 19 wherein said step of generating audible speech comprises the step of generating audible speech related to said entities on said other participant computers responsive to said text and one or more of said explicit commands as the data stream is received.

21. The method of claim 16 wherein said transferring step comprises the step of transferring a data stream including text from said one of said participant computers to said other participant computers via a host computer.

* * * * *